United States Patent [19]

Shibayama et al.

[11] 4,314,333
[45] Feb. 2, 1982

[54] DATA PROCESSOR

[75] Inventors: Shigeki Shibayama; Kazuhide Iwata; Nobuo Okuda, all of Yokohama, Japan

[73] Assignee: Tokyo Shibaura Denki Kabushiki Kaisha, Japan

[21] Appl. No.: 22,353

[22] Filed: Mar. 20, 1979

[30] Foreign Application Priority Data

Mar. 28, 1978 [JP] Japan .................................. 53-34807

[51] Int. Cl.³ ........................ G06F 13/06; G06F 9/06; G06F 7/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,748,451 | 7/1973 | Ingwersen | 235/156 |
| 3,943,495 | 3/1976 | Garlic | 364/200 |
| 4,038,533 | 7/1977 | Dummermuth | 364/900 |
| 4,041,466 | 8/1977 | Stuart | 364/900 |
| 4,101,960 | 7/1978 | Stokes | 364/200 |

OTHER PUBLICATIONS

CSP, Inc., Map a New Series of Ultrafast, Programmable, Floating Point Array Processors, 1976.

IEEE Transactions on Computers, Inner Product Computers, Jan. 1978, vol. C-27, No. 1.

Primary Examiner—Gareth D. Shaw
Assistant Examiner—David Y. Eng
Attorney, Agent, or Firm—Finnegan, Henderson, Farabow, Garrett & Dunner

[57] ABSTRACT

A data processor used with a host computer is constructed by a plurality of memory units, at least one arithmetic and logic unit, a register file and a microprogram memory for storing microprograms to control these circuit components. The first field of each microinstruction of the microprogram is supplied to a first logic converting circuit of which the output signal drives each memory unit. The third field of the microinstruction is supplied to the second logic converting circuit of which the output signal causes the data stored in selected registers of the register file to be supplied to the arithmetic and logic unit. The arithmetic and logic unit operates upon the data supplied in accordance with the designation by the second field, and loads the result of the operation into the register specified by one of the outputs of the second logic converting circuit. Each logic converting circuit alters, in accordance to the control signal designated from the exterior, a combination of the corresponding field of a microinstruction.

7 Claims, 11 Drawing Figures

FIG. 1
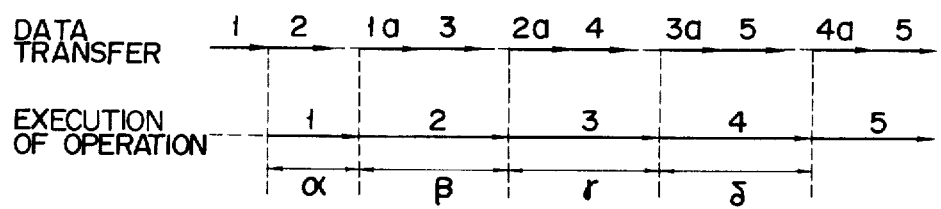
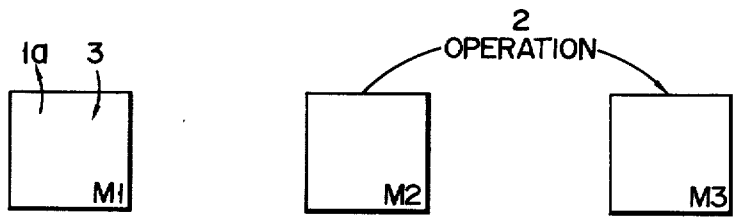
FIG. 2A
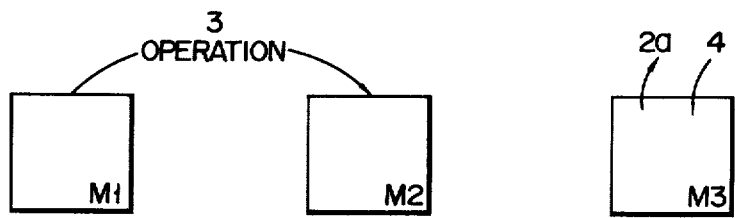
FIG. 2B
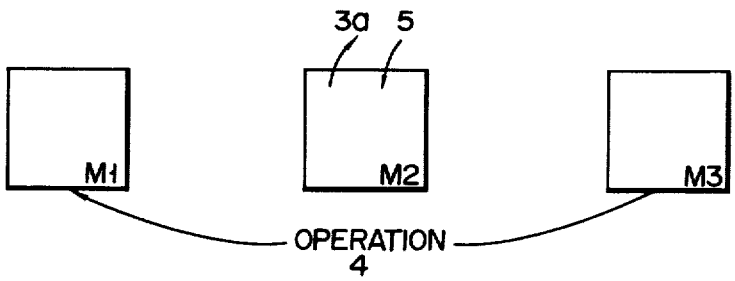
FIG. 2C

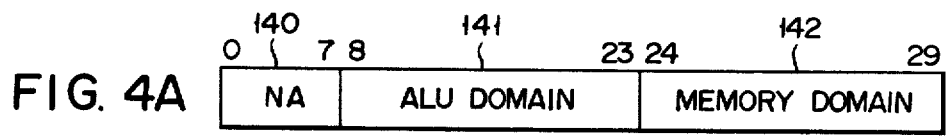
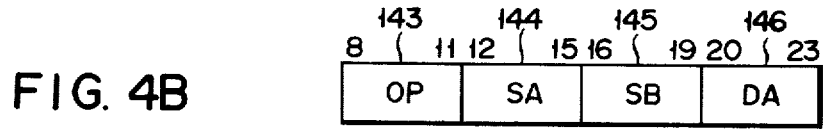
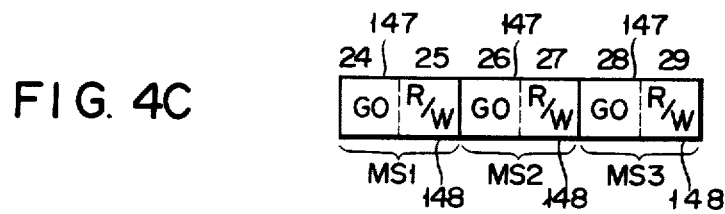
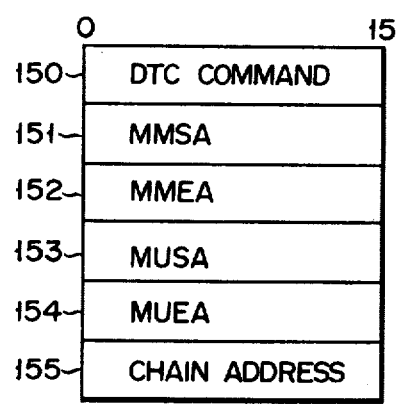
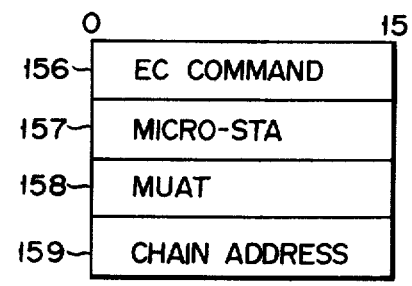
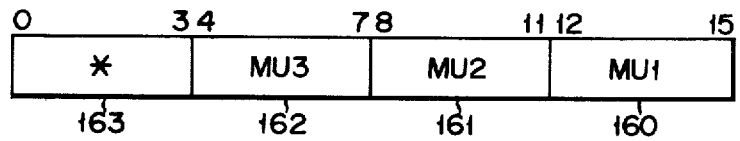

FIG. 7

| ADDRESS | OP | SA | SB | DA | MS1 | MS2 | MS3 |
|---|---|---|---|---|---|---|---|
| A | 0 0 0 0 | * | * | * | 0 0 | 1 0 | 0 0 |
| A+1 | 0 0 0 1 | 0 1 0 1 | 1 0 0 1 | 0 1 1 0 | 0 0 | 0 0 | 0 0 |
| A+2 | 0 0 0 0 | * | * | * | 0 0 | 0 0 | 1 1 |

180 181 182 183 184
185 186 187 188
189 190

DATA PROCESSOR

FIELD OF THE INVENTION

The present invention relates to a data processor, and particularly to an auxiliary data processor which processes at high speed data fed from a host computer and transfers back the result of the processing to the same computer.

DESCRIPTION OF THE PRIOR ART

A recent trend in the design of computer systems is to provide an auxiliary processor to exclusively execute operations of the type that, when they are processed by a general-purpose host computer, require an extended processing time. This is intended to improve the efficiency of the overall computer system. In the operation of the auxiliary processor, data to be operated must be transferred from the host computer to the auxiliary processor and the auxiliary processor normally has a memory of small capacity and high operating speed compared to that of the host computer. Accordingly, all the data to be processed can not be stored in the memory of the auxiliary processor, at one time and the host computer periodically transfers to the auxiliary processor the data to be processed by the auxiliary processor. This operation is repeated until the data to be processed has been fully processed. Therefore, the time taken for the data to be transferred to the auxiliary processor is so long that, even if the auxiliary processor operates at high speed, the total processing time of the data is also long, and therefore the high performance of the auxiliary processor is used with poor efficiency.

In order to effectively use the auxiliary processor, the data transfer between the host computer and the auxiliary processor and the operation execution by the auxiliary processor must be carried out in parallel. For example, as shown in FIG. 1, a data group 1 to be operated upon first is transferred from the host computer to the auxiliary processor. Then, during the next time period $\alpha$, the auxiliary processor executes the operation of the data group 1. Also during this period $\alpha$, another data group 2 is transferred from the host computer to the auxiliary processor. During the next time period $\beta$, the auxiliary processor executes the operation of data group 2, the operation result 1a of the data group 1 is transferred from the auxiliary processor back to the host computer and, following this, the host computer transfers data group 3 to the auxiliary processor. Succeedingly, the operation execution and the data transfer are performed in parallel in a similar manner. Generally the data transfer is not always performed completely in parallel with the operation execution within the same time period. Since it depends on the contents of the operation, it should be decided by comparing the data transfer rates and the operation execution time in normal mode ($\beta$, $\gamma$, $\delta$, ... in FIG. 1). Accordingly, the time required for data transfer falls within the time necessary for the execution of operation so that the total time of data processing by the auxiliary processor is substantially equal to the time for operation execution.

In order to realize such a control system, the auxiliary processor is preferably provided with three sets or more of data storing memories. For example, as shown in FIG. 2A, three memories M1, M2 and M3 are used each capable of storing data transferred from the host computer or generated by the operations of the auxiliary processor. During the period $\beta$ in FIG. 1, the memory M1 is used to transfer data groups 1a and 3 to and from the host computer, meanwhile the data group 2 which has been stored in the memory M2 during the preceding period $\alpha$ is read out from the memory M2 and operated upon with the result of the operation loaded into the memory M3. During the time period $\gamma$, data group 3 stored in the memory M1 during the preceding period $\beta$ is operated upon and the result of the operation is loaded sequentially into the memory M2, while at the same time the result of the operation 2a in the memory M3 is transferred to the host computer and then data 4 is transferred into the memory M3. See FIG. 2B. During the period $\delta$, data 4 in the memory M3 is operated upon and the result of the operation is successively loaded into the memory M1, while at the same time the memory M2 performs the transfer of data 3a and 5. See FIG. 2C. During the succeeding period, the operation similar to that in FIG. 2A is performed and similar operations like those in FIGS. 2B and C are repeated.

As just mentioned, when three sets of memories are switched in use, a burden on software is alleviated compared to the case of a single memory.

Let us consider a case where, in a data processor as mentioned above, the auxiliary processor executes operations by using microprograms. In this case, if the same operation must be applied to data groups 2, 3, 4 and so on, three microprograms corresponding to the three states of memory usage shown in FIGS. 2A, 2B and 2C must be used in the conventional system. For example, data group 2 is read out from memory M2 and data group 3 from the memory M1. Thus, the operation must be performed by using different microprograms for every period. In the conventional system, different microprograms must be prepared for a single operation. This increases the memory capacity necessary for microprograms.

Accordingly, an object of the invention is to provide a data processor which may control a plurality of memories and operate upon data by utilizing a single program and further may be used as an auxiliary processor at high speed.

SUMMARY OF THE INVENTION

To achieve the objects of the invention, there is provided a data processor comprising: a plurality of memory units;
 a register file with a series of specific addresses, including data registers which are provided for respective memory units and hold data to be read and written and address registers which are provided for respective memory units and store the addresses where the data is to be stored; at least one arithmetic and logic unit coupled to said register file; a microprogram memory, which gives control to said memory units and said arithmetic and logic unit, for storing a number of microinstructions each including a first field for designating an operation of said memory unit, a second field for designating an operation of said arithmetic and logic unit and a third field for designating the addresses of some registers of said register file, which are coupled with said arithmetic and logic unit to perform an arithmetic and logic operation;
 first logic converting circuit means connected to said microprogram and said memory units, supplied with the first field of the microinstruction read out from said microprogram memory, and used to control the memory by the output signal of said first field;

second logic converting circuit means connected to the microprogram memory and the memory units, supplied with the third field of the microinstruction read out from the microprogram memory, and used to select a register of said register file by the output signal from said third field; and means connected to the first and second logic converting circuit means and used to provide control signals to the first and second logic converting circuit means.

In another aspect of the invention, the data processor is comprised of a plurality of memory units, at least one arithmetic and logic unit, a register file and a microprogram memory for storing a microprogram to control these circuit components, wherein operations are executed by the microprogram instructions successively read out from the microprogram memory and executed.

The register file includes address registers for storing addresses in the memory units and data registers for storing data written and read to and from the memory units. These registers have specific addresses directly specified by a microinstruction. The microinstruction includes a first field (memory domain) for designating the operation of each memory unit, a second field (OP field) for designating the operation of the arithmetic and logic unit and a third field (SA, SB and DA fields) for designating the operand register address. The microinstructions are sequentially read out from the microprogram memory and are set in an instruction register. Then, the first field is supplied to the first logic converting circuit, the second field is supplied to the arithmetic and logic unit, and the third field is supplied to the second logic converting circuit.

The output signal of the first logic converting circuit drives each memory unit and the second logic converting circuit couples some of the registers in the register file with the arithmetic and logic unit. The data stored in the coupled registers are supplied to the arithmetic and logic unit. The arithmetic and logic unit performs the operation designated by the second field to the data supplied and loads the result of the operation into the register specified by one of the output signals from the second logic converting circuit. Each logic converting circuit alters, in accordance with the control signal specified from the exterior, a combination of the respective corresponding fields of a microinstruction.

For example, when the memory unit is comprised of three units MU1, MU2 and MU3, the first field of the microinstruction designates "read-out" from MU1 and "write-in" into MU2. (The term MS is used later in place of MU.) When such a microinstruction is read out from the microprogram memory, the output signal for the first logic converting circuit designates, in accordance with a control signal, "read-out" from MU2 and "write-in" to MU3, for example.

This is correspondingly applied to the second logic converting circuit. In this way, in the data processor according to the invention, the same program can execute different processes as shown in FIGS. 2A to C.

Other objects and features of the invention will be apparent from the following description taken in connection with the accompanying drawings, in which:

BRIEF DESCRIPTION OF THE DRAWINGS

FIGS. 1 and 2, including A and B, show schematic illustrations for explaining how a conventional high speed data processor operates;

FIGS. 4A to C show a format of a microinstruction used in the embodiment according to the invention;

FIG. 5, including A-C, shows a format of a privileged instruction used in the embodiment according to the invention;

FIG. 7 shows the format of a microprogram which is usable in the embodiment of the invention;

DETAILED DESCRIPTION OF THE PREFERRED EMBODIMENT

Figure 3A:
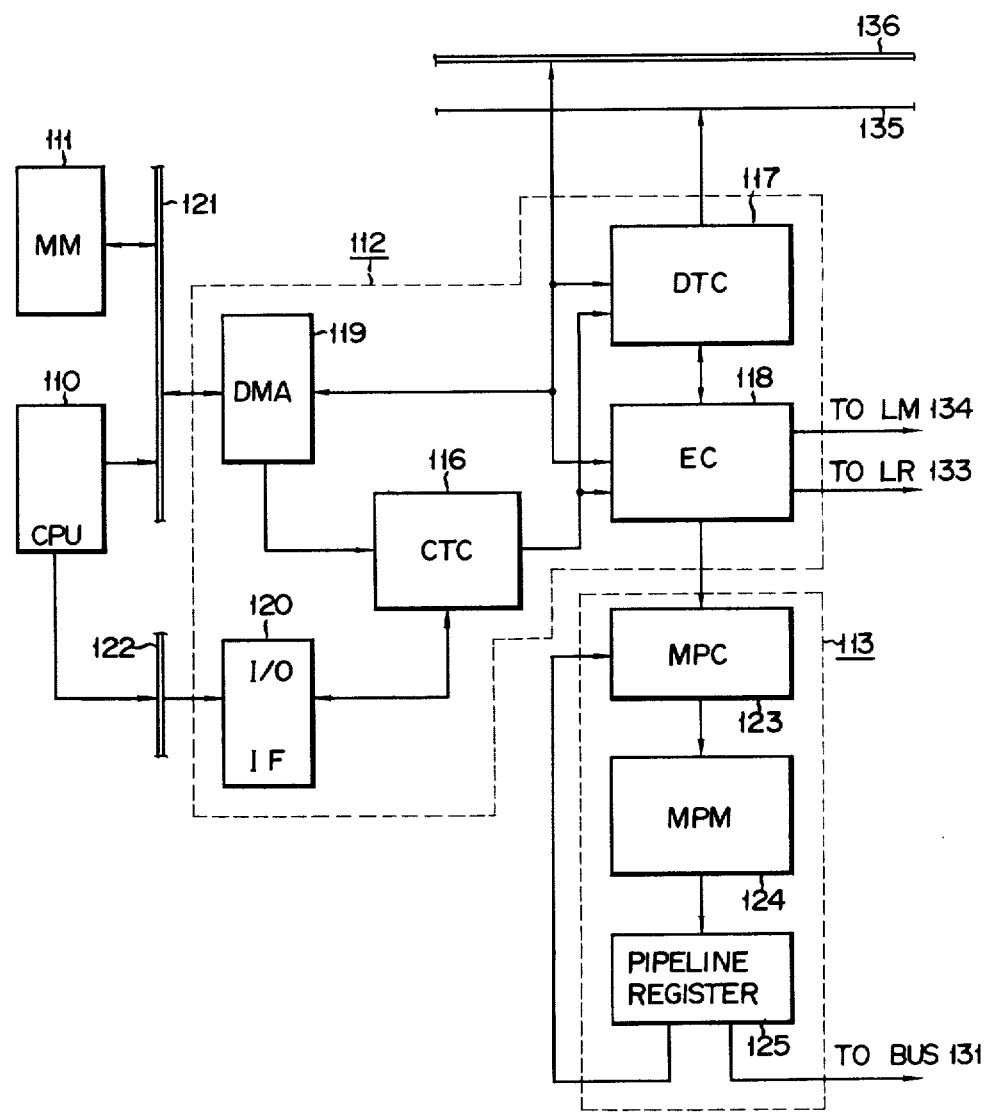
FIGS. 3A and B are combined to form a block diagram of an embodiment of a data processor according to the invention.

Reference is first made to FIG. 3 illustrating an embodiment of a data processor according to the invention. The data processor according to the invention is coupled with a host computer through buses, like a general input/output device. As shown, the host computer system is comprised of a host computer (CPU) 110 and a main memory (MM) 111. The data processor is comprised of a connection section 112, a control section 113, an operation section 114, and a memory section 115. The connection section 112, which supervises and executes the input and output between the data processor and the host computer system, is comprised of a command transfer control portion (CTC) 116, a data transfer control portion (DTC) 117, an execution control portion (EC) 118, a DMA control portion 119, and an I/O interface portion 120.

The connection section 112 is coupled with the host computer system through a DMA bus 121 and an I/O bus 122. The CTC 116 receives a command from the CPU 110, through the I/O bus 122 and the I/O interface circuit 120 and transfers the command to the DTC 117 and the EC 118. DTC 117 controls data transfer through DMA bus 121 between MM 111 and a memory section to be described later. EC 118 starts a control section to be described later.

The control section 113 is comprised of a microprogram controller (MPC) 123, a microprogram memory (MPM) 124, and a pipeline register 125. MPM 124 stores a microprogram describing a procedure of an executable portion of an operation section 114 and an access to a memory unit to be described later. MPM 124 has a memory capacity of 128 words (30 bits/word), for example, and is comprised of a RAM or ROM. MPC 123 determines the address of a microinstruction to be read out from MPM 124. The instruction read out is set in the pipeline register 125. Here, the pipeline register 125 is equivalent to an ordinary instruction register. EC 118 transfers a start address of a microprogram to MPC 123 and starts MPC 123. Succeedingly, MPC 123 produces an address to next be read out depending on the contents of the NA field of a microinstruction to be described later and on the states of certain condition codes.

The operation section 114 is comprised of a register file (RF) 126 and an arithmetic logic unit (ALU) 127.

The RF 126 is comprised of 16 16-bit general registers R0 to R15 with individual addresses, which are operable as source and destination registers for ALU 127. In those registers, registers R0 to R2 are assigned to the address registers of memory units MU1 to MU3 to be described later, respectively, and registers R4 to R6 to the data registers of memory units MU1 to MU3, respectively. ALU 127 is capable of performing parallel 16-bit operations.

The memory section 115 includes three individual memories 128 to 130 and also denoted as MU1 to MU3. Each memory unit has a memory capacity of 4 KW (16 bits/W), for example, and individual addresses 0 to 4095 (decimal). Each memory unit permits parallel read and write operations and is further provided with two ports; one for a read/write operation from RF 126 and the other for read/write operation from DMA control portion 119.

Turning now to FIG. 4, there is shown a format of a microprogram instruction stored in MPM 124. In the format, the NA field 140 is used to determine the next microinstruction address of the microprogram, i.e., the address of the microinstruction to next be executed. Specifically, the NA field of the microinstruction stored in the pipeline register 125 is sent to the MPC 123. ALU domain 141 is used to control the operation section 114 and comprises fields as shown in FIG. 4B. In ALU domain 141, an OP field 143 designates the operation performed by ALU 127. An SA field 144 and an SB field 145 designate the address of the source register in RF 126 for storing data to be operated by ALU 127. A DA field 146 designates the address of the register in RF 126 in which the result of operation by ALU 127 is stored. A memory domain 142 designates the operations of three memories MS1 to MS3, as shown in FIG. 4C, that is to say, it controls the memory section 115. MS1 to MS3 are the names of memories in the microprograms (software). The relation of these with memory units MU1 to MU3 (in hardware) will be described later. GO bit 147 corresponds to an enable signal of the corresponding memory. R/W bit 148 designates read or write for the corresponding memory.

Returning to FIGS. 3A and B, in the microinstruction loaded from MPM 124 into the register 125, ALU domain 141 and memory domain 142 are supplied to the operation section 114 and the memory section 115, respectively, through a bus 131. OP field 143 is loaded into register 132 and then commands the operation of ALU 127.

SA field 144, SB field 145 and DA field 146 are supplied to a logic converting circuit (LR) 133. The output signal of LR 133 selects the registers in RF 126. Memory domain 142 is supplied to logic converting circuit (LM) 134. The output of LM 134 controls the memory units 128, 129 and 130. A control signal to designate the logic conversion of LR 133 and LM 134 is supplied from EC 118.

The operation of the data processor shown in FIGS. 3A and 3B will described hereinafter. The operation of the data processor starts when CPU 110 provides initial data to CTC 116 through I/O bus 122 and I/O interface circuit 120. The data includes the address of the data to be supplied from MM 111 to CTC 116. CTC 116 drives DMA control portion 119 and receives a series of data from MM 111 through DMA bus 121 and DMA control portion 119. The data is classified into data transfer control block (DTCB) to be supplied to DTC 117 and execution control block (ECB) to be supplied to EC 118.

An example to DTCB is shown in FIG. 5A. DTC command field 150 designates the operation to be controlled by DTC 117, for example, data transfer from MM 111 to the memory section 115 or vice versa. MMSA field 151 and MMEA field 152 are the start address and the end address of MM 111. MUSA field 153 and MUEA field 154 are the start address and the end address of each memory unit MU1 128, MU2 129 and MU3 130. Chain address field 155 is the address of MM 111 in which DTCB to next be executed is stored.

An example of ECB is shown in FIG. 5B. EC command field 156 controls the operation to be controlled by EC 118. MICRO-STA field 157 represents the start address of a microprogram. MUAT (Memory unit assignment table) 158 controls logic converting circuits 133 and 134. Chain address field 159 represents the address of MM 111 where the ECB to be executed next is stored. In this example, DTCB and ECB may be considered instructions which are higher in level than a microprogram and which are given for every segment of processing (within each period shown in FIG. 1) by the data processor. DTCB and ECB are fetched by DMA control section not CPU 110 before each segmental processing starts.

FIG. 5C shows an example of MUAT field 158. MU1 field 160 designates correspondence between the operation designation part of the memory unit MU1 in hardware and a memory designation part of the microprogram. Similarly, MU2 and MU3 fields 161 and 162 designate the memories in the microprogram memory to which units MU2 129 and MU3 130 of the hardware correspond. The contents of the MUAT field thus constructed comprise control signals for logic converting circuit 133 and 134.

Control section 113 starts to operate when EC 118 supplies MICRO-STA field 157 of ECB to MPC 123. MPC 123 supplies the start address of a microprogram in MPM 124, i.e. the contents of MICRO-STA field 157, the MPM 124 thereby causing the corresponding microinstructions to be fetched. The microinstruction read out from MPM 124 is set in pipeline register 125. ALU domain 141 and memory domain 142 in the microinstruction are transferred to operation section 114 and memory section 115, through bus 131 and are executed. At this time, NA field 140 is supplied to MPC 123 where the address of a microinstruction to be executed next is determined. The execution of the microinstruction and the read out of the microinstruction to next be executed are thereafter carried out in parallel.

Under control of DTC 117, data transfer is carried out between MM 111 and any one of memory units MU1, MU2 and MU3. The direction of the data transfer is determined by DTC command field 150. For example, when data in MM 111 is transferred to memory unit MU1 128, the contents of MMSA field and MMEA field 152 drive DMA control portion 119 to sequentially read out data in MM 111 through DMA bus 121. The contents of the MUSA field 152 and the MUEA field 154 supply an address to address bus 135 and the data read out from MM 111 through DMA bus 121, DMA control portion 119, and memory bus 136 into the address location thereof. Use of DTC 117 and EC 118 enables the data transfer and the execution of operation to be performed in parallel and at high speed.

Figure 6A:
FIG. 6, including A-C, shows an example of the MUAT field shown in FIG. 5C.

As described above, an operation by the data processor of the invention is performed in such a manner that data in a memory unit is processed and the result of the operation is stored in another memory unit. In the case of three sets of memory units, there may be three cases as shown in FIGS. 2A, B and C as follows: (1) the data from memory unit MU2 is processed and the result of the processing is stored in memory MU3, (2) the data from memory unit MU1 is processed and the result of the processing is stored in memory unit MU2, (3) the data in MU3 is processed and the result of the processing is stored in memory unit MU1. MUAT field (FIG. 5C) is used to designate relationships between memories MS1 to MS3 in a microprogram and memory units MU1 to MU3 in hardware. In the case of (1), the MUAT is given as shown in FIG. 6A. That is, the following relations are designated

MU1:MS1
MU2:MS2
MU3:MS3

Figure 6B:
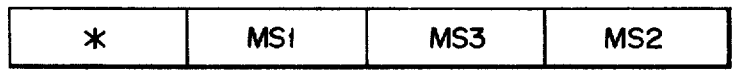

In the case of (2), the following relations are designated as shown in FIG. 6B

MU1:MS2
MU2:MS3
MU3:MS1

In the case of (3), MUAT field designates the following relations and as shown in FIG. 5C.

MU1:MS3
MU2:MS1
MU3:MS2

It is assumed that the respective registers in RF 126 in the microprogram are coded as shown in Table 1.

TABLE 1

| Code | Register |
| --- | --- |
| 0000 | Address register of memory MS1 |
| 0001 | Address register of memory MS2 |
| 0010 | Address register of memory MS3 |
| 0011 | R3 |
| 0100 | Data register of memory MS1 |
| 0101 | Data register of memory MS2 |
| 0110 | Data register of memory MS3 |
| 0111 | R7 |
| 1000 | R8 |
| 1001 | R9 |
| 1010 | R10 |
| 1011 | R11 |
| 1100 | R12 |
| 1101 | R13 |
| 1110 | R14 |
| 1111 | R15 |

Memory domain 142 transferred through bus 131 is converted as indicated in the relationship in Table 1, by LM 134. Similarly, SA, SB and DA fields are converted in LR 133. Let us consider a microprogram (NA field is omitted) as shown in FIG. 7. The microinstruction in address A has "0000" in operation field 180, i.e. NO OPERATION (NOP). In this case, the contents of SA, SB and DA fields 181 to 183 are insignificant but since the contents of MS2 field 184 is "10", it designates the read-out of memory MS2. In the case of (1), memory MS2 corresponds to memory unit MU2 and thus LM 134 supplies an access signal to memory unit MU2 and outputs data in location of MU2 defined by the address in the register R1 of RF 126 to register R5. Also in this machine cycle, ALU 127 does nothing.

In the next machine cycle, the microinstruction stored in a location defined by an address (A+1) is executed. In the instruction, the memory does not operate while ALU 127 executes an operation. Since "0001" in OP field 185 designates the execution of addition, the contents of the registers specified by the SA field 186 and the SB 187 field are added to each other and the result of the addition is set in the register specified by DA field 188. "0101" of SA field 186 designates the data register of memory MS2 so that, in the case of (1), register R5 is selected by LR 133. SB field 187 designates register R9 of "1001". DA field 188 is "0110" and designates the data register of memory MS3. Accordingly, the contents of registers R5 and R9 are supplied to ALU 127 through buses 137 and 138, and the result of the operation is loaded into register R6 through bus 139. In the succeeding machine cycle, the microinstruction in the location defined by address (A+2) is executed. OP field 189 of the microinstruction location defined by an address (A+2) is "0000" (NOP), and therefore ALU 127 does not operate in this cycle. MS3 field 190 is "11" so that the write-in to memory MS3 is designated. When the MUAT field designates (1) in FIG. 6A, memory MS3 corresponds to memory MU3 and hence LM 134 applies an access signal to memory MU3 and loads the operation result in register R6 to the location of memory MU3 defined by the address in the register R2.

Also in the case of (2), the data processor can do an operation by using the same program as shown in FIG. 7. In this case, the MUAT shown in FIG. 6B is transferred to LR 133 and LM 134 from EC 118. In the microinstruction of the address A, ALU 127 is in NOP mode but "read-out" is designated by memory MS2. Since memory MS2 corresponds to memory unit MU1 at present, LM 134 supplies an access signal to memory unit MU1 so that the data stored in the address specified by address register R0 is outputted to the data register R4. In the succeeding machine cycle, the microinstruction in an address (A+1) is executed. This microinstruction designates that ALU 127 executes an addition. Augend data has been stored in the data register of memory MS2 and in the register R9 by SA field and SB field as shown in Table 1. Since memory MS2 corresponds to memory unit MU1, LR 133 selects registers R4 and R9 the former is the data register of memory unit MU1. The data in registers R4 and R9 are applied through buses 137 and 138 to ALU 127. ALU 127 executes an addition and the result of the addition must be stored in the data register of memory MS3 specified by DA field. Memory MS3 is made to correspond to memory unit MU2. The result of the operation is stored in register R5, the MU2 data register, and the execution of the microinstruction in address (A+1) ends. The microinstruction in the address (A+2) "write-in" to memory MS3 has been designated. Since memory MS3 is made to correspond to memory unit MU2, the contents of register R5 is loaded into an address specified by register R2.

Figure 6C:

Also in the case of (3), if the MUAT shown in FIG. 6C is provided, the data processor can process it by the instructions as shown in FIG. 7.

Figure 8:
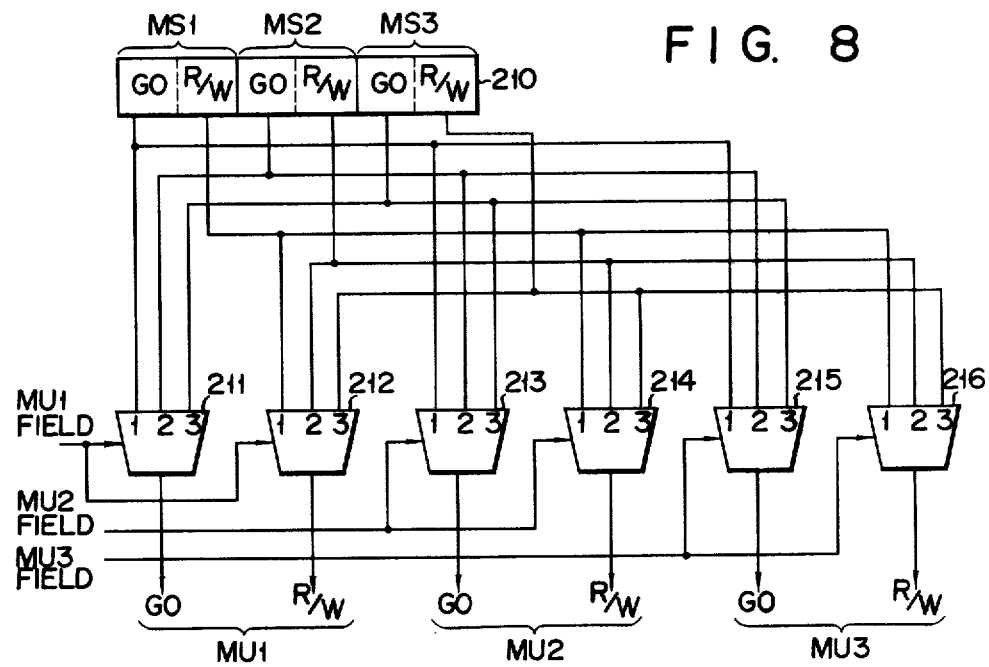
FIG. 8 shows a block diagram of a logic converting circuit for converting a memory domain.

Turning now to FIG. 8, there is shown an example of LM 134 for converting the memory domain. In the figure, the information in memory domain 210 is selectively supplied to multiplexers 211 to 216. The MUAT field is supplied from EC 118 as the control signal for the respective multiplexers. For example, the MU1 field of the MUAT is the control signal for multiplexers 211 and 212. The MU2 field is the control signal for multiplexers 213 and 214. The MU3 field is the control signal for multiplexers 215 and 216. When the MU1 field is (MS1), multiplexers 211 and 212 produce signals supplied at the input terminals 1, respectively. When the MU1 field is (MS2) or (MS3), it produces output signals supplied at input terminals 2 or 3. This is correspondingly applied to multiplexers 213 and 214, and 215 and 216. The output signals of multiplexers 211 and 212 are supplied to memory unit MU1. The output signals of multiplexers 213 and 214 are supplied to memory unit MU2 and the output signals of multiplexers 215 and 216 are supplied to memory unit MU3.

Figure 9:
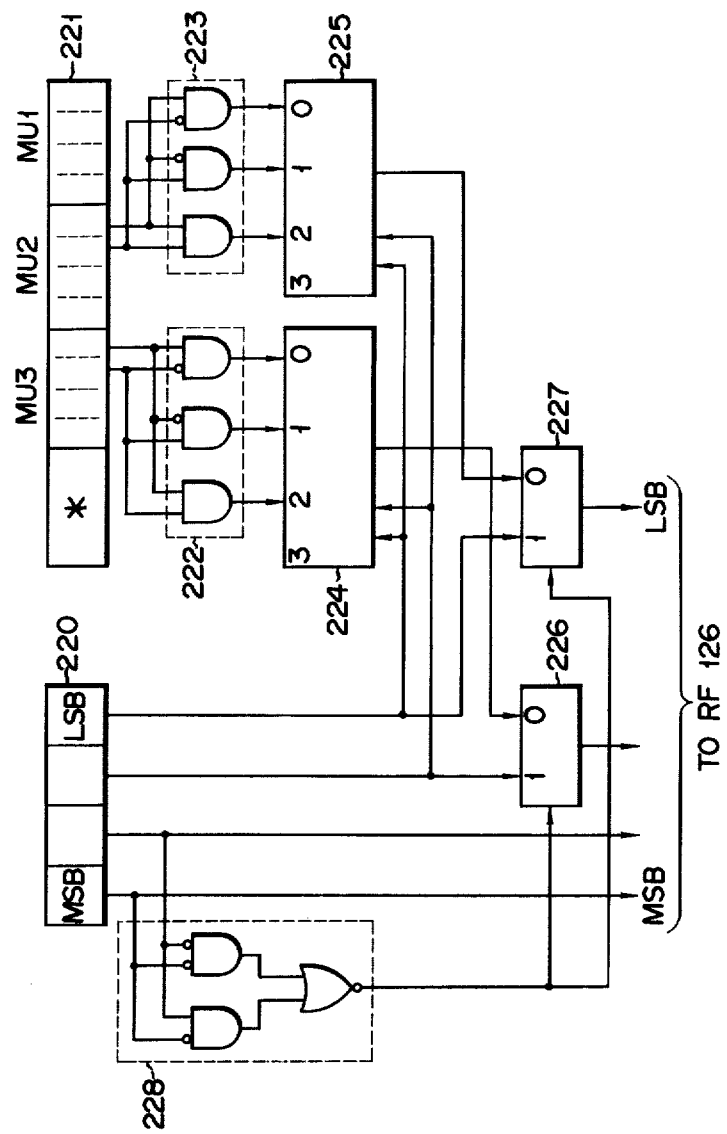
FIG. 9 shows a block diagram of a logic converting circuit for SA field, SB field and DA field.

FIG. 9 shows an example of LR 133 for executing the conversion of the SA field, BA field and DA field. SA field (BA field or DA field) 220 is constructed by 4 bits. MU1, MU2 and MU3, which constitute the MUAT field 221, supplied from EC 118 are constructed by 4 bits. In these fields, information "0001" designates memory unit MU1, "0010" designates memory unit MU2 and "0011" designates memory unit MU3. Information in the MU3 field is supplied to the input terminal of multiplexer 224, through gate group 222. Information in MU2 field is supplied to the input terminal of multiplexer 225, through gate group 223. The lower two bits of register designation information 220 are used as selection signals for multiplexers 224 and 225. When the selection signal of two bits is "00", the 0 input terminal is selected and, when it is "01", "10", and "11", the input terminals 1, 2 and 3 are selected, respectively. The outputs of the multiplexers 224 and 245 are supplied to the input terminals 0 of multiplexers 226 and 227. The other input terminals 1 of multiplexers 226 and 227 are supplied with the lower two bits of register designation information 220. The upper two bits of register designation information 220 supplied through gate group 228 are used for the selection signals of these multiplexers 226 and 227. The upper two bits of register designation information 220 are directly used for the upper two bits of the output signal of LR 133. The output signals of multiplexers 226 and 227 are used for the lower two bits of the output signal of LR 133. When the address information is "0101", the data register of memory MS2 is designated, as seen from table 1. In the case of (1) with the MUAT of FIG. 6A, the output signal of LR 133 is "0101" and designates register R5 of RF 126. In the case of (2) with the MUAT of FIG. 6B, the output signal of LR 133 is "0100" and designates the register R4 of RF 126. In the case of (3) with the MUAT of FIG. 6C, the output signal of LR 133 is "0110" and designates register R6 of RF 126.

As shown in Table 1, in this example, the codes subjected to the address conversion are the code with the upper two bits "00" for designating the address register and the code with the upper two bits "01" for designating the data register. With respect to other codes, LR 133 produces the same output signal as the input signal; however, even if all the codes are converted, there arises no problem in particular provided that a microprogram is programmed regardless of the prior register contents. The circuits shown in FIG. 9 are provided corresponding to all the fields for designating the registers by a microprogram. Alternately, a single circuit may be used in time division mode for SA, SB and DA fields.

Figure 3B:
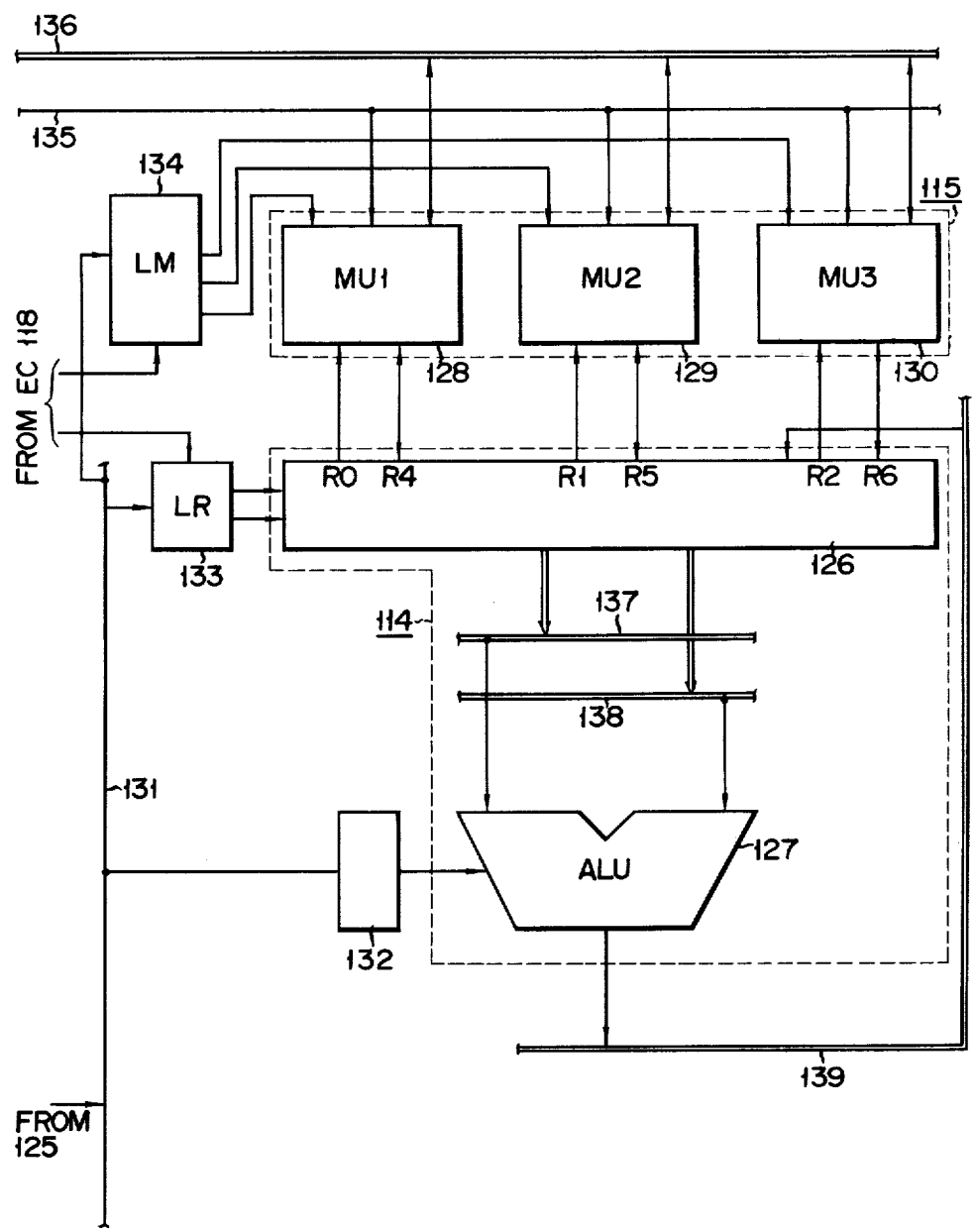
Figure 10:
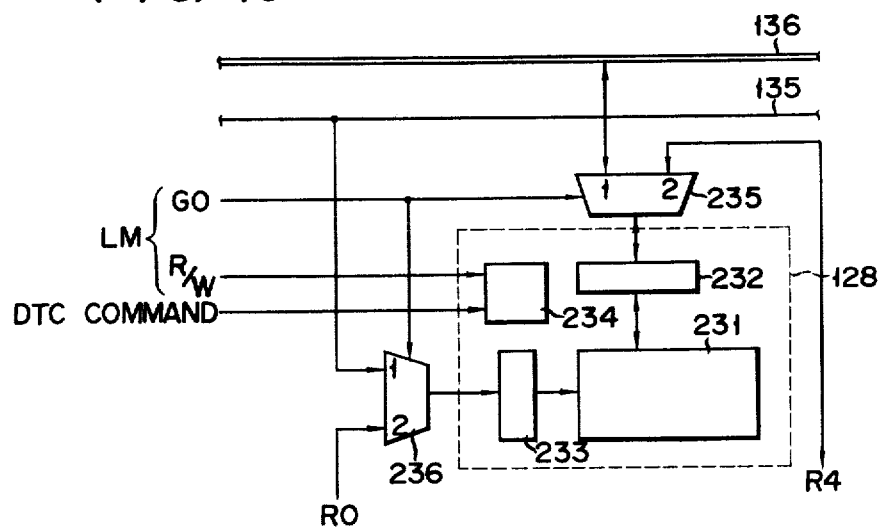
FIG. 10 shows a block diagram of an example of a memory unit.

Turning now to FIG. 10, there is shown an example of memory unit MU1 of the data processor shown in FIG. 3B. The other memory units MU2 and MU3 may also be as described above, memory unit MU1 is controlled by both DTC 117 and the microprogram. In the figure, memory unit MU1 is comprised of memory array 231, internal data register 232, internal address register 233 and control circuit 234. Multiplexer 235 is connected at the terminal 1 with bus 136 and at the terminal 2 with data register R4 of memory unit MU1 of RF 126. Multiplexer 236 is connected at terminal 1 to address bus 135 and at the terminal 2 to address register R0 of memory unit MU1 in RF 126. When a control signal GO is applied through LM 134, multiplexers 235 and 236 select the terminal 2 and internal register 233 is set to the contents of register R0. At this time, in response to a control signal R/W fed through LM 134, when in read mode, data read out from memory array 231 into internal data register 232 is supplied to register R4 through multiplexer 235. In write mode, the contents of register R4 is stored into the address designated by internal address register 233 within memory array 231 after it is set in internal data register 232 through multiplexer 235. When no control signal GO is supplied, multiplexers 235 and 236 select the terminal 1. At this time, when a DTC command is supplied from DTC 117, memory unit MU1 effects "write-in" of data supplied from MM 111 through bus 136 and DMA control portion 119 or "read-out" of data supplied to MM 111.

As seen from the foregoing description, the data processor according to the invention is operable as an auxiliary processor which operates at high speed the data supplied from a host computer and transfers upon result of the operation to the host computer. Further, the data processor can shorten considerably the processing time. Particularly, a number of operations are possible by using the same microprogram so that a small capacity suffices for a microprogram memory for control.

Figure 11:
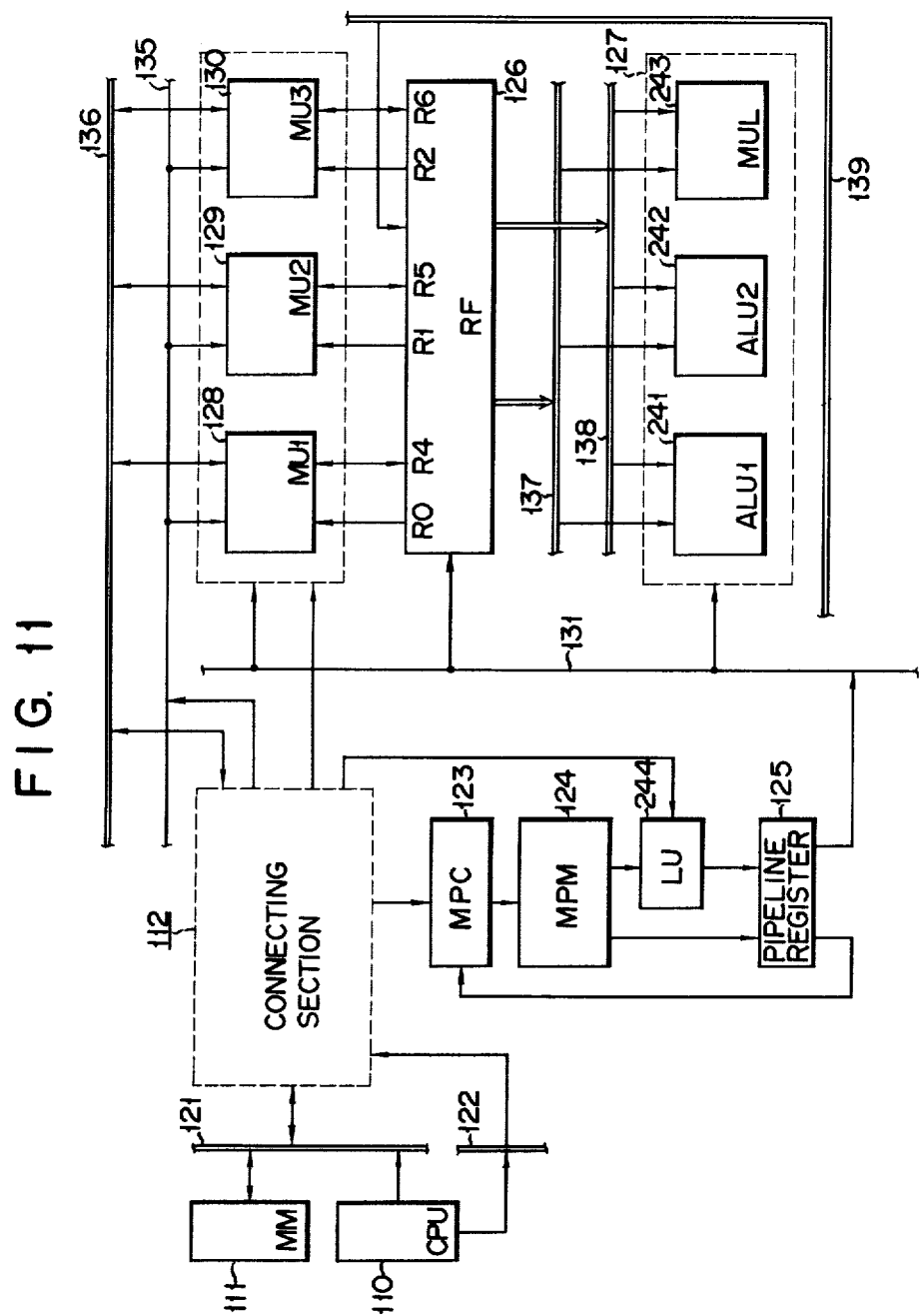
FIG. 11 shows a block diagram of another embodiment of a data processor according to the invention.

FIG. 11, which will now be described, shows another embodiment of the data processor according to the invention. In the figure, like reference numerals designate like portions or parts in FIGS. 3A and B. A block designated by a broken line 112 designates a connection section including CTC 116, DTC 117, EC 118, DMA control portion 119 and I/O interface circuit 120, as shown in FIG. 3A. One of the features of the example resides in the provision of first operation unit 241 (ALU1), second operation unit 242 (ALU2), and multiplier 243 (MUL). With this provision, higher and more complex operations are possible, compared to the example shown in FIGS. 3A and B. For example, when picture data is processed, a given operation is executed for each position of a picture element. An ordinary memory device stores picture data in the order of picture positions; however, data to be operated is not necessarily arranged in this order. In such a case, the order of data is rearranged so as to be the order of the operation and then is applied to the auxiliary data processor, aiming at the shortening of the processing time. On the other hand, in this example, the image data stored by MM 111 may be transferred to the memory portion without changing the order. When the sum of products, for example, are performed by using ALU2 242 and MUL 243, ALU1 241 may calculate the address of the data taken from the memory portion. In this example, the data corresponding to the address calculated by ALU1 241 is taken out of the memory portion, and the result of the operation performed by ALU2 242 and MUL 243 is loaded again into the address calculated by ALU1 241. Through this operation, the time of processing may be reduced without changing the order of picture data. This feature is very useful when each input picture data influences each picture element position of the output picture data.

The other feature of the example shown in FIG. 11 is that the microinstruction read out from MPM 124 is altered in accordance with the MUAT by logic converting circuit (LU) 244 before it is set in the pipeline register 125. A combination of those shown in FIGS. 8 and 9 may be used for the logic conversion circuit 244. In the microinstruction read out from MPM 124, the field specifying the operation of the memory (memory domain) and the field for specifying the register of the source or destination (SA, SB and DA fields) are supplied to the logic conversion circuit 244. The other fields are set in pipeline register 125 in their original states. The MUAT table memory may be provided in the control section instead of specifying a MUAT from the host computer to designate the MUAT used. Any number of memory units may be used, although this example employs three sets of memory units.

A processor in which any one of the operation units is comprised of a multiplication circuit may be exclusively used for executing the convolution or the sum of products performed at high speed. In the calculation of $$D = \sum_{i=1}^{N} Ai*Bi,$$

the product (Ai*Bi) is calculated by using MUL 243 and the summation thereof is calculated by ALU2 242. The accumulated value may be obtained only for the time to calculate the product, since MUL 243 and ALU2 243 operate in parallel.

What we claim is:

1. An auxiliary processing system for use in a data processing system wherein a host computer selectively transfers to the auxiliary processing system host control signals for controlling the operation of the subsystem and processing operations to be performed on associated data stored in a main memory coupled to the host processor and wherein the auxiliary processing subsystem performs the transferred operations on the associated data and returns the processing results to the host computer, the auxiliary processing system comprising:

a plurality of physical memory units, each of said physical memory units including a series of addressable storage locations;

an arithmetic and logic unit means;

a register file including a plurality of addressable pairs of associated address and data registers coupled to said arithmetic and logic unit means, each of said physical memory units being coupled to a different one of said pairs of registers for the transfer of data and associated addresses between said arithmetic and logic unit means and said physical memory units;

a microprogram memory for storing a set of microinstructions, each of said microinstructions including a set of ALU control signals for designating an operation to be performed by said arithmetic and logic unit means, a set of register control signals for designating at least two of said pairs of associated address and data registers in said register file to be used to transfer data between said arithmetic and logic unit means and said physical memory units associated with the designated register pairs during the performance of said designated operation, and a set of memory control signals to be used to control the operation of said associated physical memory units during the execution of said designated operations;

means for transferring data between said main memory and one of said physical memory units other than said associated physical memory units and for controlling the storing and accessing of data stored in said physical memory units in response to said host control signals from said host computer, said one of said physical memory units being selectively designated by said host control signals;

first control means for receiving said set of memory control signals and applying said received set of memory control signals selectively to said physical memory units associated with said designated register pairs under the control of said host control signals for controlling said associated physical memory units to enable the transfer of data to and from said associated physical memory units and the data registers coupled thereto whenever said ALU control signals designate data transfers between said physical memory units and said arithmetic and logic unit means; and second control means for converting said register control signals into the addresses of particular registers in said register file selected by said host control signals and for controlling the transfer of data through said selected data registers between said arithmetic and logic unit means and said associated physical memory untis coupled to said slected data registers whereby the auxiliary processing subsystem multiplexes among said pluralities of physical memory units and register pairs to dynamically select physical memory units and data registers to be used during the execution of said microinstructions.

2. A data processor according to claim 1 wherein said first control means comprises a plurality of address multiplexers, each of said address multiplexers receiving at data input terminals said plurality of memory control signals and being controlled by said host control signals to output address control signals for controlling the addressing of particular ones of said physical memory units.

3. A data processor according to claim 2 wherein each of said pairs of registers in said register file is designated by a multiple bit register address number and wherein said second control means comprises:

a plurality of logic gates receiving said address control signals from said address multiplexers and for outputting selected bits of said address control signals;

a register address control multiplexer means for receiving said outputted selected address control signal bits and for selecting a first pair of said address control signal bits under the control of a first set of selected bits of a said selected one of said register control signals designating a said register pair;

a control circuit for generating a selector signal having a first value or a second value from a second set of selected bits of said selected one of said register control signals;

a first register control output multiplexer for receiving a first of said first pair of address control signal bits and a first of said first pair of selected bits of said selected one of said register control signals, said first register control output multiplexer for outputting said first of said first pair of address control signal bits when said selector signal has said first value and said first of said first set of selected bits of said selected one of said register control signals when said selector signal has said second value; and a second register control output multiplexer for receiving a second of said first pair of address control signal bits and a second of said first set of said selected bits of said selected one of said register control signals, said second register control output multiplexer for outputting said second of said selected pair of address control signal bits when said selector signal has said first value and for outputting said second of said first set of said selected bits of said selected one of said register control signals when said selector signal has said second value.

4. A data processor according to claim 1 wherein said arithmetic and logic unit means comprises a plurality of arithmetic and logic units.

5. An auxiliary processing system according to claim 4 further including control register means coupled to said microprogram memory and said first logic control means for storing said host control signals and wherein said first logic control means comprises a plurality of memory multiplexer means, each of said memory multiplexer means being associated with a different one of said plurality of physical memory units, each of said memory multiplexer means for receiving as inputs said set of memory control signals and for selecting one of said received memory control signals under the control of said host control signals stored in said control register means to generate physical memory signals identifying said physical memory units to be coupled to said arithmetic and logic unit means for data transfers therebetween.

6. A subprocessing system according to claim 1 wherein said second control means comprises:

a plurality of register control multiplexers for receiving said host control signals;

first means for controlling said register control multiplexers to select and to output first selector signals designating said memory units to be coupled to said data registers designated by said register control signals;

a register address multiplexer for receiving said first selector signals and predetermined ones of said register control signals; and second means responsive to others of said register control signals for controlling said register address multiplexer to output the address of a said data register to be used to transfer data between said arithmetic and logic unit means and one of said designated physical memory units during the performance of said designated operation.

7. A subprogram processing system according to claim 1 wherein said arithmetic and logic unit means comprises a plurality of arithmetic and logic units and a multiplier circuit.

* * * * *